Sept. 12, 1961  R. R. MYERS  2,999,703
PLUGGED ASSEMBLIES
Filed Aug. 19, 1958

*INVENTOR*
ROBERT R. MYERS
BY *S. Ernest Low.*
*ATTORNEY*

United States Patent Office 2,999,703
Patented Sept. 12, 1961

2,999,703
PLUGGED ASSEMBLIES
Robert R. Myers, McKeesport, Pa., assignor to Aluminum Company of America, Pittsburgh, Pa., a corporation of Pennsylvania
Filed Aug. 19, 1958, Ser. No. 755,920
6 Claims. (Cl. 287—1)

This invention relates generally to plugged assemblies, and methods of producing the same, incorporating a member having an aperture through a wall thereof which has been securely plugged as a result of plastic deformation of the material of the member immediately adjacent the aperture therein into engaging locked relationship with, and plastic displacement of, an initially preformed plug positioned within the aperture.

Practice of the invention finds ready application in plugging or sealing-off drainage and lubricating orifices or apertures, inspection holes prior to a final assembly operation, and in similar apertured members requiring plugging against unauthorized and unintentional removal of the plugs installed in accordance with the practice of the invention.

The invention has found particular adaptation in compression fittings of the tubular sleeve type, as such devices are commonly employed to connect sections of cable and similar rod-like members, or serve to attach auxiliary devices to a cable or the like, wherein a tubular sleeve element is compressively engaged on the exposed surface of one or more cable or rod-like members. In such compressive sleeve members, it is usual to provide at least one orifice or aperture through a wall of the sleeve to permit introduction of a corrosion-preventing fluid, or other unctuous material, between the interior surface of the sleeve and adjacent surface of the underlying cable, thereafter seal-off or plug the aperture, and then compressibly and plastically deform the sleeve and its plug into tight unitary locked engagement of the plug within the sleeve member, as well as the sleeve member on its supporting cable.

It is an object of the invention to provide an assembly comprising a member having an aperture through a wall thereof plugged by means of an initially preformed plug held and locked in place through plastic deformation of the member adjacent its aperture into engagement with and displacement of the preformed plug.

It is another object of the invention to provide an assembly of a compression sleeve on a cable, or similar member, having a locked, plugged orifice through a wall of the sleeve.

Another object of the invention is to provide a method for plugging an aperture involving plastic deformation of the member adjacent its aperture, as well as plastic deformation and displacement of an initially preformed plug within the aperture.

Other objects and advantages of the invention will be understood and appreciated from a consideration of the following description and drawings, in which.

Basically the invention pertains to assemblies and methods of making the same, in which an aperture or orifice through a member is provided with a preformed plug member which is securely locked within the wall of the aperture member as a result of plastic deformation of both the preformed plug and the material of the apertured member, at least adjacent the aperture, to provide a sealed and locked plugged assembly. A salient feature of the invention lies in plastic deformation of the apertured member, and the plug within the aperture, in a manner which insures a final unitary assembly of the apertured member and plug characterized by an enlargement of the cross-sectional area of the plug below its exposed terminal end surface to some cross-sectional area greater than its exposed end surface area, to thereby prevent axial outward withdrawal of the plug from the apertured member.

Figure 2:
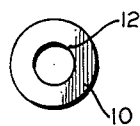
FIG. 2 represents an end view of the plug of FIG. 1, as viewed from the left thereof.
Figure 1:
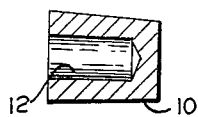
FIG. 1 represents a longitudinal section through a preformed plug made in accordance with the invention.
Figure 3:
FIG. 3 represents an end view of the plug of FIG. 1, as viewed from the right thereof.

Referring to the illustrations representing a specific embodiment of the invention, a preformed plug element 10, FIGS. 1, 2 and 3, is preferably provided in the form of a frustum of a cone in metal, or other suitable plastically deformable material, with an internal bottomed or blind cavity 12 drilled or otherwise formed in the body of the plug. The cavity 12 has been illustrated as a straight circular bore entering the plug from its largest end surface and terminating short of its smaller end, but obviously the cavity could be of any other cross-section. Similarly, the plug 10 could be of any desired cross-section, other than circular, such as square or polygonal.

Figure 4:
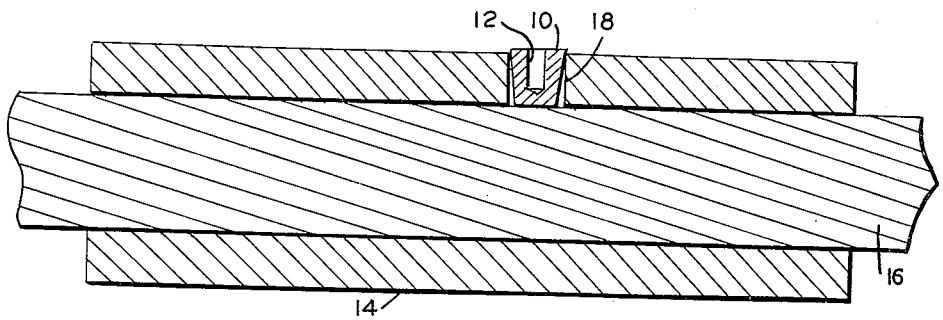
FIG. 4 represents a longitudinal sectional elevation through a compression sleeve, and a preformed plug positioned within an aperture through the wall of the sleeve, in the assembled application of the sleeve and plug on a stranded cable before compression of the assembly.

In FIG. 4, a tubular sleeve member 14 has been slidably positioned on a cable 16, the sleeve being provided with an aperture 18 through the wall thereof. The aperture 18 is preferably a drilled hole of constant bore, in the case of a truncated cone shaped preformed plug 10, and the preformed plug 10 inserted therein is preferably a snug or drive fit within the aperture through engagement of the plug 10 at some transverse plane along its axial length, preferably at or adjacent its largest end, with the straight or axially parallel bore of the aperture 18. The plug 10 is also preferably of an axial length equal to the wall thickness of the sleeve 14 in the axis of the aperture 18. However, the plug 10 may be slightly longer or slightly shorter than the axial depth of the aperture 18 or wall thickness of sleeve 14. Regardless of the transverse cross-sectional shape of the preformed tapered plug 10, the aperture 18 is preferably of substantially complementary transverse cross-section in the transverse plane of registry on initial engagement between the plug and aperture, the bore of the aperture 18 being otherwise preferably straight or axially parallel.

Figure 5:
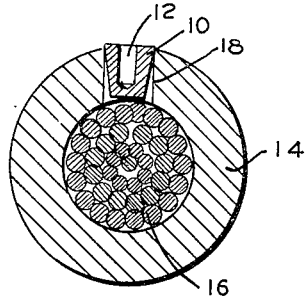
FIG. 5 represents a cross-sectional elevation through the assembly illustrated in FIG. 4 prior to compression of the sleeve and its plug.

FIG. 5 illustrates the arrangement of the elements of FIG. 4 in cross-sectional elevation. It is to be observed that the plug 10 has been illustrated as extending slightly above the exposed surface of the sleeve 14. It may, if desired, lie flush with the exposed surface of sleeve 14 or be slightly depressed below this exposed surface, as previously stated.

Figure 6:
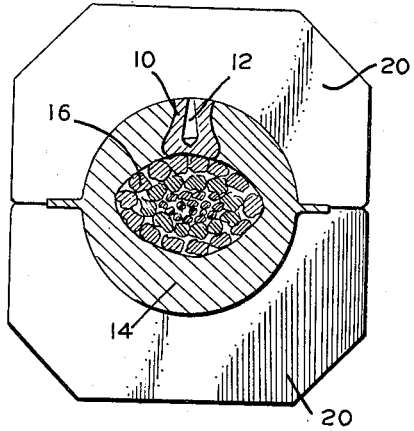
FIG. 6 represents a cross-sectional elevation similar to FIG. 5 following compression of the sleeve, plug and supporting cable.

FIG. 6 illustrates the assembly of FIGS. 4 and 5 following compression of the sleeve 14 and its preformed plug 10 into tight compressive relationship on the cable 16. The compressing operation normally plastically distorts the generally circular cross-section of the cable to some form of substantially elliptical cross-section, herein illustrated, when substantially semi-cylindrical mating die halves 20 are employed in the compressing step. It will be observed in this regard that the preformed plug 10 has also been plastically deformed to axially upset the same and swell its inwardly disposed end to some cross-sectional area greater than its outwardly disposed, axially inwardly collapsed opposite terminal end, collapsing of the plug 10 being augmented by the initially provided cavity 12 in the plug.

It has been found in practice that the displacement of the material of the preformed plug 10 will vary somewhat over or along its axial length, as will the straight parallel bore of aperture 18 in the sleeve 14. A complete reverse taper over the axial length of the preformed plug has been obtained following its compression in some instances, varying stages of reversal of the taper, including the somewhat arcuate or curvilinear outline of the plug 10 shown in FIG. 6, being more usual. In all cases, however, the plug 10, following its plastic deformation and displacement within an aperture represented by the aperture 18, was found to be upset and swelled adjacent its innermost terminal end to a greater cross-sectional area than any other cross-sectional area of the plug along its axial length.

It has also been observed in the practice of the invention that the terminal end of the plug 10 furthest removed from the exposed end thereof, following plastic deformation or compression of the same, will on occasion extend slightly inwardly beyond the interior surface or bore of the sleeve 14. This usually occurs when the axial length of the plug 10 is greater than that essential to insure its upset innermost swelled terminal end, while still providing an exposed terminal flush with the outer surface of the sleeve 14. The arcuate or curved sleeve-engaging surfaces of the compression dies 20 insure blending of the exposed terminal end of plug 10 with the outer surface of the sleeve 14 and otherwise react to axially force the opposite end of the plug towards or into the interior bore of the sleeve, as a result of the compressive, plastic deformation step.

Hexagonal compression dies, such as illustrated in United States Letters Patent No. 2,151,032, granted March 21, 1939, have been employed in place of the illustrated cavitied substantially semi-circular dies 20, with equal success, in the plastic deformation of compression sleeves containing the preformed cavitied plugs 10 of the invention hereinabove described.

Having selected a specific embodiment of preformed plug and apertured member to be plugged through plastic deformation of the material of the member adjacent its aperture, with simultaneous plastic displacement of the preformed plug within the aperture, it will be readily recognized that the invention is not limited in its application to the single disclosure and description contained in the specification, except as defined in the claims appended hereto.

What is claimed is:

1. A method of plugging an apertured member comprising the steps, selecting a blind cavitied tapered plug of dimensional volume to substantially fill the aperture in the member to be plugged, inserting the plug in the aperture from an exterior outer surface of the member with its largest terminal face and entrance to the blind cavity facing outwardly, and thereafter substantially simultaneously plastically deforming the member immediately adjacent the aperture, and the unitary tapered plug within the same, to upset the plug into intimate locked surface contact with the wall of the aperture in substantially reversed taper to the initial tapered plug.

2. A method of plugging an apertured member comprising the steps, selecting a blind cavitied tapered plug of dimensional volume to substantially fill the aperture in the member to be plugged, inserting the plug in the aperture of the member with the axis of the blind cavity in substantial axial alignment with the axis of the aperture and the entrance to the cavity in the largest terminal face of the tapered plug facing outwardly, and thereafter substantially simultaneously plastically deforming the member immediately adjacent the aperture, and the tapered plug within the same, to upset the plug into intimate unitary locked surface contact of the plug with the wall of the aperture in substantially reversed taper to the initial tapered plug.

3. A method of providing a plugged compression sleeve assembly on a cable, the steps comprising, selecting a plastically deformable sleeve having an aperture through its wall, slidably placing the apertured sleeve on the cable, selecting a plastically deformable blind orifice tapered plug of dimensional volume to substantially fill the aperture, inserting the tapered plug in the aperture from the exposed surface of the sleeve with the axis of its blind orifice in substantial axial alignment with the axis of the aperture and the entrance to the blind orifice in the largest terminal face of the tapered plug facing outwardly, and thereafter subjecting the assembly of sleeve and tapered plug to compressive force against the cable to partially displace the sleeve and plug into intimate close engagement of the inner surface of the sleeve and inner terminal face of the plug with the cable supporting the sleeve, and displacing material of the tapered plug into its blind orifice in maximum amount remote from the blind end of the orifice to thereby substantially reverse the taper of the initially selected tapered plug.

4. The method of plugging an apertured sleeve capable of plastic deformation on a cable, the steps comprising, slidably placing a sleeve having a straight axial bore aperture through the wall thereof over the cable, selecting a preformed blind orifice tapered plug of dimensional volume capable of substantially filling the aperture, driving the preformed tapered plug axially into the aperture into snug engagement of a perimetrical transverse cross-section of the tapered plug in engagement with the straight axial bore of the aperture adjacent the outer exposed surface of the sleeve, the tapered plug being otherwise in tapered relationship and out of contact with the straight axial bore aperture below its snug transverse engagement therewith and presenting the entrance to the blind orifice outwardly remote from the cable, and then subjecting the assembly of sleeve and plug to compressive deformation against the cable to plastically displace the sleeve and plug into tight intimate engagement with the cable and each other, whereby portions of the plug are displaced into the blind orifice thereof adjacent the exposed outer end of the plug to decrease its initially large cross-sectional area and the initially smaller cross-sectional area of the tapered plug is swelled adjacent the cable.

5. The combination with a cable of a plastically deformable sleeve surrounding and supported on said cable, said sleeve having an aperture through a wall thereof, a plastically deformable plug in said aperture having a blind orifice extending axially into the same from an exposed terminal end face thereof remote from the cable, and said plug and sleeve plastically deformed into compressive engagement with each other and with the cable with the plug completely filling the aperture and having a maximum cross-sectional area of the plug within the aperture adjacent the cable.

6. The combination with an elongate rod-like member of a plastically deformable sleeve surrounding and supported on said rod-like member, said sleeve having an aperture through a wall thereof, a plastically deformable plug in said aperture having a blind orifice extending axially into the same from an exposed terminal end face thereof remote from the rod-like member, said plug and sleeve plastically deformed into compressive engagement with each other and with the rod-like member with the plug completely filling the aperture in said sleeve, and said plug having a maximum swelled terminal end within the aperture adjacent the rod-like member and its opposite end flush with the exposed outer surface of the sleeve.

References Cited in the file of this patent

UNITED STATES PATENTS

| | | |
|---|---|---|
| 1,346,506 | Mollerhoj | July 13, 1920 |
| 1,661,997 | Campbell | Mar. 6, 1928 |
| 1,778,540 | Wikstrom | Oct. 14, 1930 |
| 2,064,129 | Temple | Dec. 15, 1936 |
| 2,296,443 | Kleinfelder | Sept. 22, 1942 |
| 2,464,432 | Brickman | Mar. 15, 1949 |
| 2,684,778 | Staller | July 27, 1954 |

FOREIGN PATENTS

| | | |
|---|---|---|
| 567,861 | Great Britain | Mar. 6, 1945 |
| 920,711 | France | Apr. 16, 1947 |